United States Patent [19]

Nomura et al.

[11] Patent Number: 4,658,297
[45] Date of Patent: Apr. 14, 1987

[54] AUTOMATIC GAIN CONTROL CIRCUIT

[75] Inventors: Hiroshi Nomura, Moriguchi; Tetsuo Kubota, Higashiosaka, both of Japan

[73] Assignee: Sanyo Electric Co., Ltd., Osaka, Japan

[21] Appl. No.: 746,159

[22] Filed: Jun. 18, 1985

[30] Foreign Application Priority Data

Jun. 20, 1985 [JP] Japan ................. 59-126921

[51] Int. Cl.$^4$ .............................................. H04N 5/52
[52] U.S. Cl. ..................................... 358/174; 358/176
[58] Field of Search ................. 358/174, 176, 178, 179

[56] References Cited

U.S. PATENT DOCUMENTS 3,249,695  5/1966  Loughlin et al. ................. 358/178
4,121,252 10/1978  Saiki et al. ..................... 358/176 X
4,149,190  4/1979  Wessler et al. ................... 358/174

OTHER PUBLICATIONS

"Monolithic ICs for Video Processing Circuit", by Norio Meki et al, National Technical Report, vol. 25, No. 1, published Feb. 1979, pp. 102-106.

Primary Examiner—Michael A. Masinick
Assistant Examiner—E. Anne Toth
Attorney, Agent, or Firm—Armstrong, Nikaido, Marmelstein & Kubovcik

[57] ABSTRACT

An automatic gain control (AGC) circuit 30 includes a pulse mixing circuit 31 for mixing a reference pulse P having a specified amplitude in a pedestal of a composite video signal with a sync-tip level of a synchronizing signal clamped. Based on the reference pulse P, keyed AGC operation is performed preferentially and peak AGC operation based on detection of the peak of a video signal V is performed as required. According to the change of reference voltage by a variable resistor VR for setting of an AGC operation level, electric currents $I_2$ and $I_1$ flowing in mirror circuits $Q_{11}$ and $Q_4$ change. As a result, the amplitude of the reference pulse P changes in proportion to the change of the reference voltage. Thus, a wide range of effective output gain can be applied.

4 Claims, 6 Drawing Figures

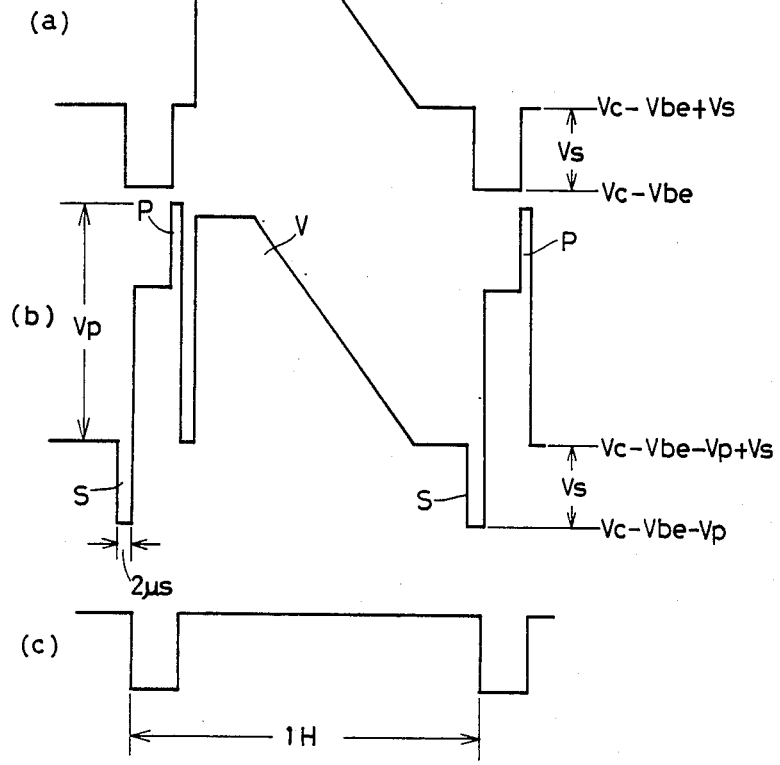
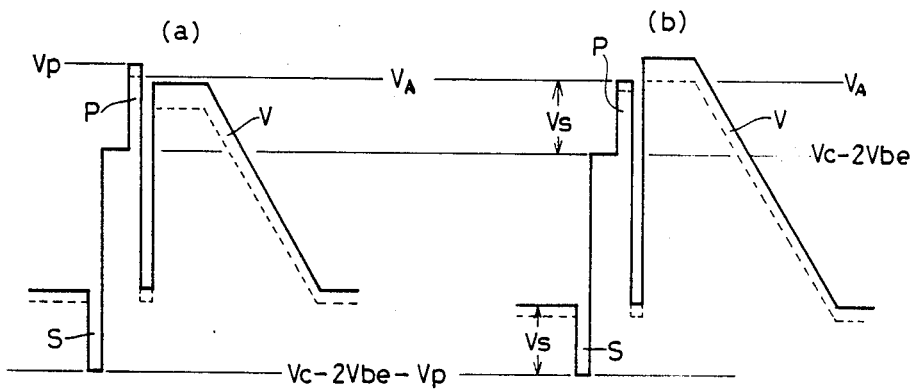

AUTOMATIC GAIN CONTROL CIRCUIT

BACKGROUND OF THE INVENTION

1. Field of the Invention

The present invention relates to an automatic gain control (AGC) circuit and particularly to a video AGC circuit for use in a video unit such as a video tape recorder, a video disc player and the like.

2. Description of the Prior Art

In a video tape recorder, for example, the magnitude of a luminance signal (a composite video signal) applied from a video camera or a television tuner needs to be made equal to a certain value so that the signal may be frequency modulated and recorded. For this purpose, a video AGC circuit is generally utilized.

As such video AGC circuits, various types have been proposed. Recently, there is a growing demand for an AGC circuit of the type giving preference to keyed AGC operation in combination with peak AGC operation as indicated for example in pages 102 to 105 in "National Technical Report Vol. 25, No. 1" (published in Feb., 1979)

An AGC circuit of this type is generally constructed as shown in FIG. 1. Referring to FIG. 1, the reference numeral 20 denotes a video AGC circuit; the reference numeral 1 denotes an input terminal of a composite video signal; the reference numeral 2 denotes a gain control amplifying circuit; the reference numeral 3 denotes an output terminal of a gain controlled composite video signal; the reference numeral 4 denotes a synchronizing signal separation circuit for separating horizontal and vertical synchronizing signals from a composite video signal; the reference numeral 5 denotes a sync-tip clamp circuit for clamping to a certain potential the sync-tip level of a synchronizing signal of a video signal provided from the above stated control circuit 2; the reference numeral 6 denotes a delay circuit for delaying the above stated synchronizing signal by approximately 2 μsec.; the reference numeral 7 denotes a pulse mixing circuit for mixing a reference pulse with the composite video signal from the clamp circuit 5; the reference numeral 8 denotes a detecting circuit for detecting the peak of the output signal of the pulse mixing circuit 7; the reference numeral 9 denotes a comparator for comparing a peak potential at the point B of the peak detecting circuit 8 and a reference potential at the point A preset by a variable resistor VR; and the reference numeral 10 denotes a connection line for controlling the above stated control circuit 2 according to the output of comparison.

In a conventional AGC circuit shown in FIG. 1, the level of a reference pulse applied thereto is always fixed to a certain value even if the reference voltage level for automatic gain control operation (AGC operation) is changed by a variable resistor VR. As a result, a disadvantage is involved that desired AGC operation giving preference to keyed AGC in combination with peak AGC might become impossible dependent on the state of a composite video signal.

SUMMARY OF THE INVENTION

The present invention is an AGC circuit for performing AGC operation giving preference to keyed AGC in combination with peak AGC, by which the amplitude level of a reference pulse applied to a pedestal of a composite video signal for keyed AGC operation is changed or deceased in proportion to the change of reference voltage for setting an AGC operation level.

Thus, in this invention, if the reference voltage for setting an AGC operation level is changed to vary the output gain of a video signal, the amplitude value of a reference pulse serving as a reference for keyed AGC operation is also changed according to that change. Accordingly, it is made possible to provide an AGC circuit capable of always performing AGC operation giving preference to keyed AGC in combination with peak AGC irrespective of the change in the output level.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3, 4, 5 and 6 are signal waveform diagrams for explaining the operation of the circuit shown in FIG. 2.

DESCRIPTION OF THE PREFERRED EMBODIMENTS

Figure 2:
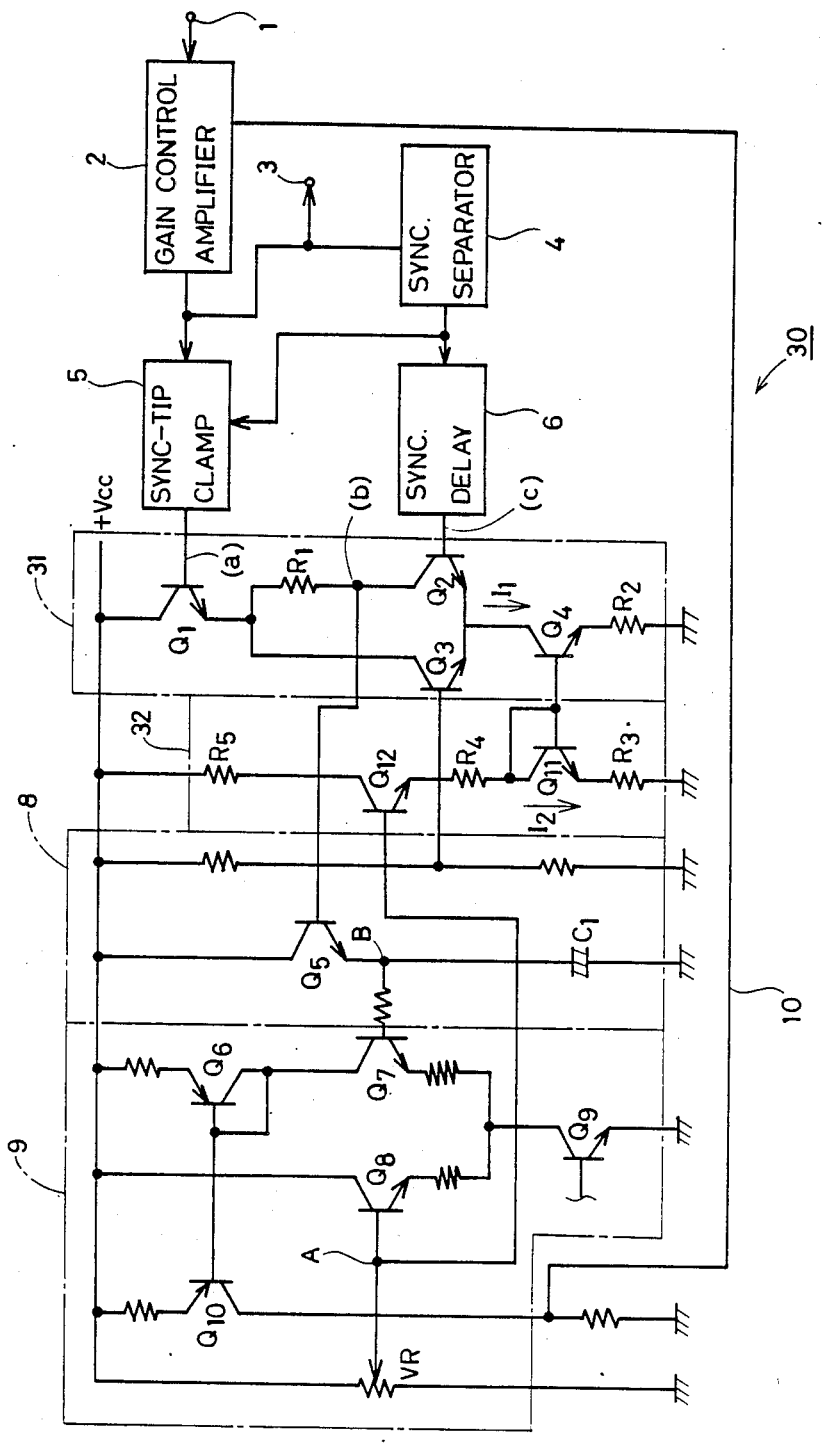
FIG. 2 is a block diagram showing a video AGC circuit of an embodiment of the present invention.

FIG. 2 is a block diagram showing a video AGC circuit of an embodiment of the present invention. Referring to FIG. 2, a video AGC circuit 30 includes an input terminal 1 for a composite video signal. The input terminal 1 is connected to a gain control amplifying circuit 2. The gain control amplifying circuit 2 controls the gain of a composite video signal applied based on a control signal supplied through a connection line 10 to be described later. The gain controlled composite video signal is provided from an output terminal 3 on the output side of the circuit 2. On the output side of the gain control amplifying circuit 2, a synchronizing signal separating circuit 4 and a sync-tip clamp circuit 5 are connected. The synchronizing signal separating circuit 4 separates a horizontal synchronizing signal and a vertical synchronizing signal from the composite video signal. The synchronizing signal separating circuit 4 is connected to the sync-tip clamp circuit 5 and a delay circuit 6. Based on the synchronizing signal from the synchronizing signal separating circuit 4, the sync-tip clamp circuit 5 clamps to a fixed potential the sync-tip level of the synchronizing signals included in the composite video signal applied from the gain control amplifying circuit 2. The delay circuit 6 delays the synchronizing signals by approximately 2 μsec. The sync-tip clamp circuit 5 and the delay circuit 6 are connected to a pulse mixing circuit 31.

The pulse mixing circuit 31 mixes a reference pulse in the composite video signal based on the input signals from the circuit 5 and 6. For this purpose, the pulse mixing circuit 31 is constructed so that the reference pulse is equivalently mixed in the composite video signal by shifting the level of the composite video signal applied from the sync-tip clamp circuit 5 only in a period of the low level of the delayed synchronizing signal applied from the delay circuit 6, as described below in detail.

In place of the above described construction of the pulse mixing circuit 31 of this embodiment, another construction may be adopted in which the reference pulse is mixed directly in a front porch of a pedestal of the composite video signal without level shifting of the composite video signal.

The pulse mixing circuit 31 is connected to a peak detecting circuit 8. The peak detecting circuit 8 detects peaks of the composite video signal including the mixed reference pulse (namely, a peak of the reference pulse and a peak of the video signal). To the peak detecting circuit 8, a comparator 9 is connected. The comparator 9 compares the peak potential appearing at the point B of the peak detecting circuit 8 and the reference potential at the point A set by an incorporated variable resistor VR so as to provide a gain control signal. The gain control signal is applied to the gain control amplifying circuit 2 through the connection line 10.

A circuit 32 connected between the variable resistor VR and the pulse mixing circuit 31 is a reference pulse adjusting circuit for changing the amplitude of the reference pulse mixed in the composite video signal in proportion to the reference potential at the point A set by the variable resistor VR. This embodiment is characterized by providing this reference pulse adjusting circuit 32.

The construction of the reference pulse adjusting circuit 32 will be described in detail. The reference pulse adjusting circuit 32 comprises a transistor $Q_{11}$. A current mirror couple is formed by the transistor $Q_{11}$ and a constant current transistor $Q_4$ for controlling the current flowing in a differential couple of transistors $Q_2$ and $Q_3$ in the pulse mixing circuit 31. The collector of the transistor $Q_{11}$ is connected to a power source $+V_{CC}$ by series connection of a resistor $R_4$, a transistor $Q_{12}$ and a resistor $R_5$, while the emitter of the transistor $Q_{11}$ is grounded through a resistor $R_3$. The base of the transistor $Q_{12}$ is connected to the reference potential setting point A set by the variable resistor VR.

FIGS. 3 to 6 are signal waveform diagrams for explaining the operation of the video AGC circuit 30 shown in FIG. 2.

First, referring to FIGS. 2, 3 and 4, a fundamental AGC operation of the circuit 30 will be described.

Assuming that the composite video signal provided at the point (a) from the synchronizing clamp circuit 5 is represented as (a) in FIG. 3 and that the delayed synchronizing signal from the delay circuit 6 is represented as (c) in FIG. 3, the transistor $Q_2$ of the differential couple is turned off in a period of the low level of the synchronizing signal (c) and turned on in a period of the high level thereof. Accordingly, the level of the video signal (a) is shifted by a value $V_p$ only in the above described high level period and a synthesized signal appearing at the point (b) is as shown in FIG. 3(b). The peak of the synthesized signal (b) is detected by the transistor $Q_5$ and a capacitor $C_1$.

Now, let us consider a case where the amplitude of a synchronizing signal component S of the composite video signal (in FIG. 3(b)) provided from the sync-tip clamp circuit 5 is increased. In this case, in the waveform before detection of the peak appearing at the point B of the circuit 30, the top end of the reference pulse P exceeds the reference potential $V_A$ as shown by the solid line in FIG. 4(a). Then, in this case, the top end level of the reference pulse P is compared with the reference potential $V_A$ at the point A by a differential couple of transistors $Q_7$ and $Q_8$ of the comparator 9 so that the level is gain controlled to be equal to $V_A$. Thus, as shown by the broken lines in FIG. 4(a), the amplitude of the synchronizing signal component S and the amplitude of the video signal component V are both reduced.

On the contrary, in case where the peak of the video signal component V exceeds the reference potential $V_A$ as shown by the solid line in FIG. 4(b), gain control is applied so that the peak is equal to the reference potential $V_A$. Accordingly, in this case also, the amplitude of the video signal component V and that of the synchronizing signal component S are both reduced as shown by the broken lines in FIG. 4(b).

In other words, generally, automatic gain control operation (AGC operation) is performed such that the top end level of the reference pulse P, that is, the amplitude $V_S$ of the synchronizing signal component S, may have a fixed value, and in the case where a signal as shown in FIG. 4(b) is applied, AGC operation is performed such that the level in the peak of the video signal component V may have a fixed value. Thus, the AGC circuit performs AGC operation giving preference to keyed AGC with peak AGC as required.

Figure 1:
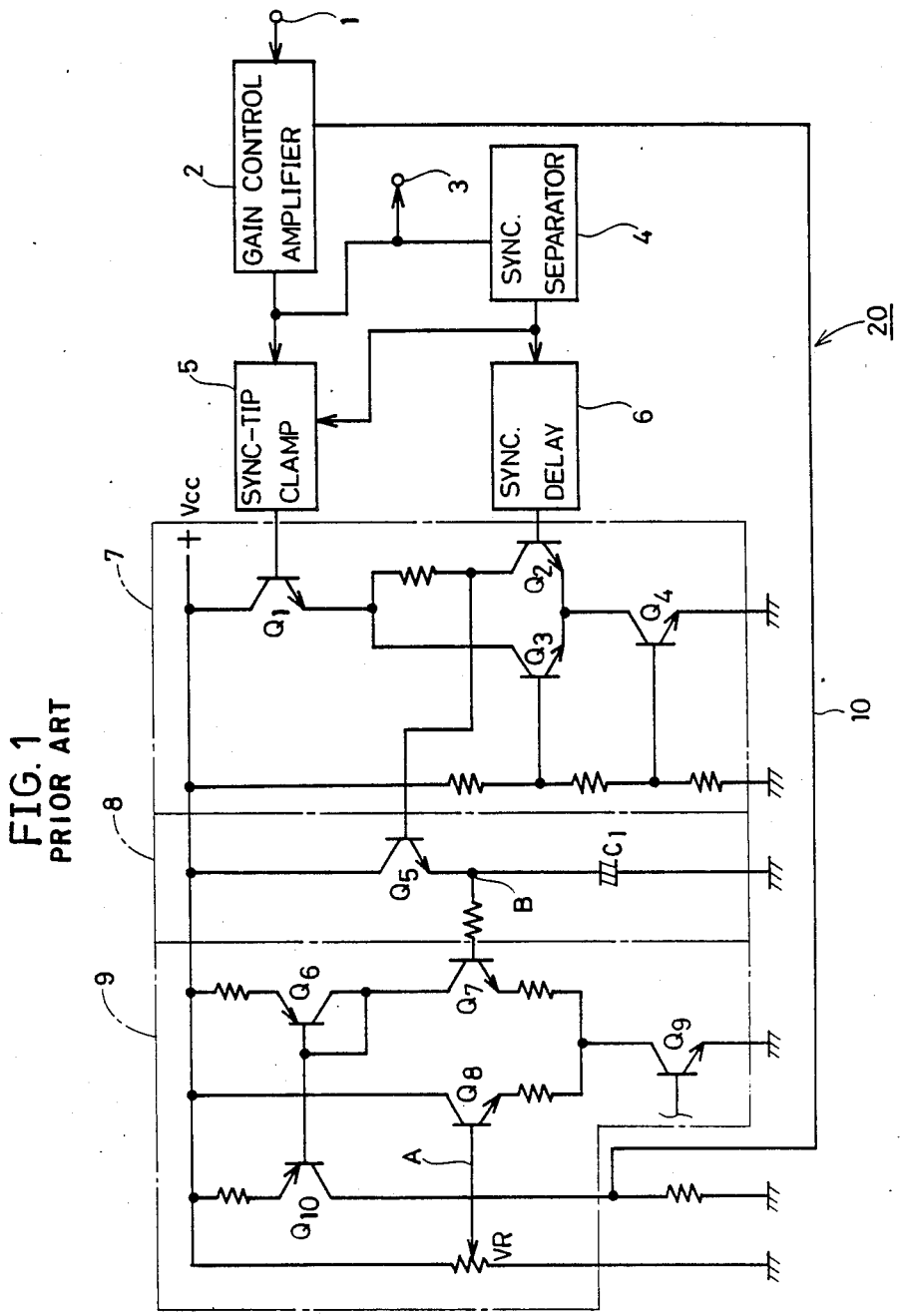
FIG. 1 is a block diagram showing an example of a conventional video AGC circuit.
Figure 5:
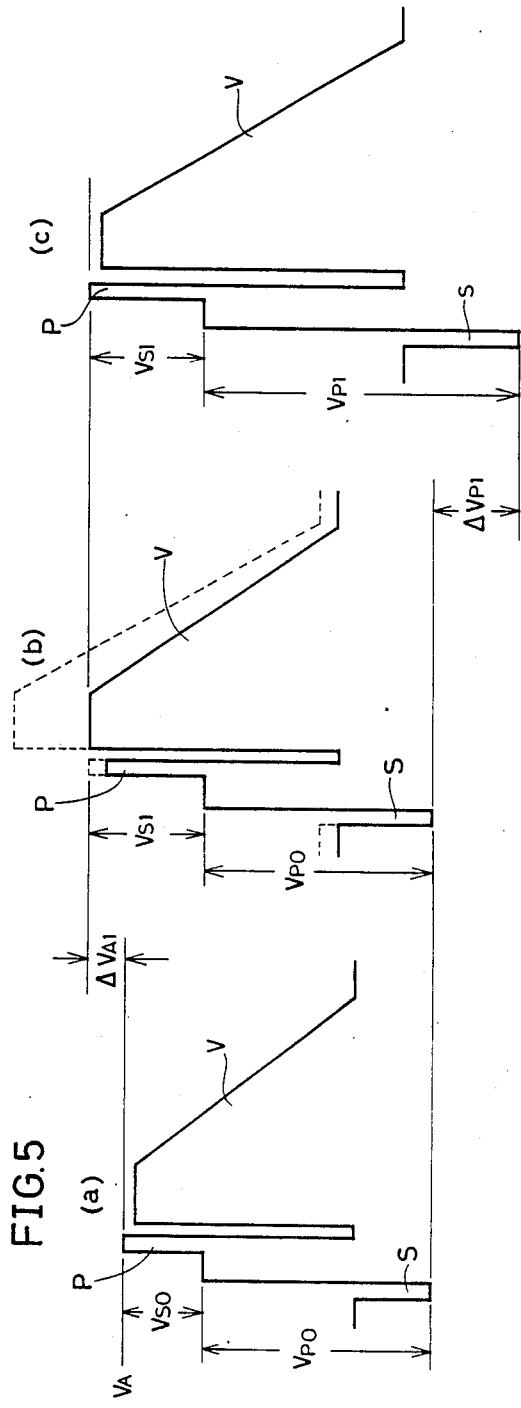
Figure 6:
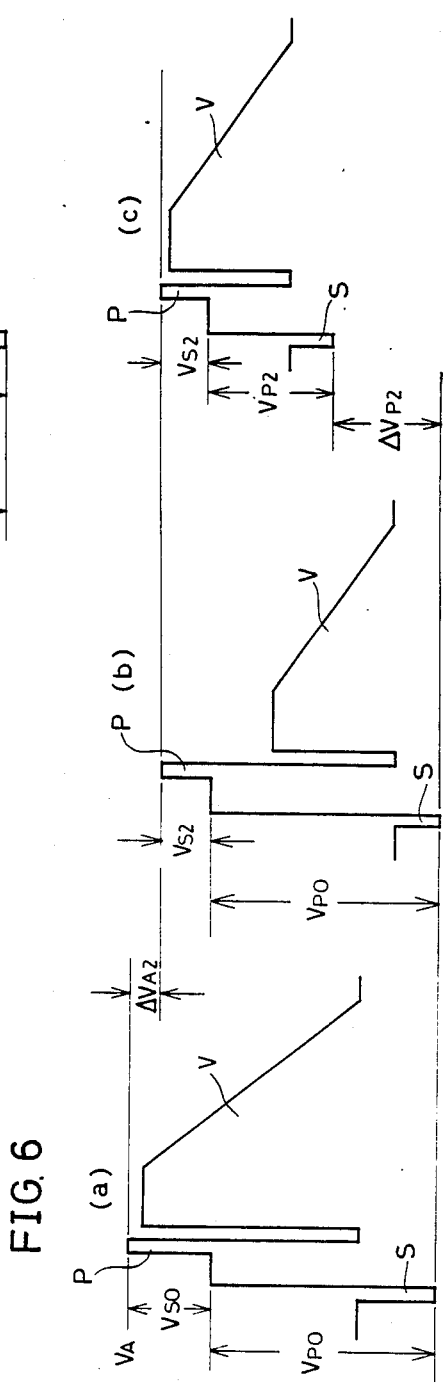

Further, let us consider a case where the amplitude (output gain) of the composite video signal provided from the output terminal 3 is increased. In this case, the reference potential $V_A$ has only to be increased. Referring to FIGS. 5 and 6, it is assumed that the reference potential $V_A$ shown in FIG. 5(a) is increased by $\Delta V_{A1}$. Then, in the conventional video AGC circuit 20 (see FIG. 1), the gain of the composite video signal is increased by the operation of the comparator 9 so that the top end of the reference pulse P may be equal to the new reference potential $V_A + \Delta V_{A1}$. In consequence, as shown in FIG. 5(b), the amplitude of the synchronizing signal component S is increased from the initial value $V_{S0}$ by $\Delta V_{A1}$ so as to be $V_{S1}$. On the other hand, the amplitude of the video signal component V is also increased by a ratio $V_{S1}/V_{S0}$, which is the same for the synchronizing signal component S, so as to be as shown by the broken line in FIG. 5(b). However, if the video signal component V exceeds the reference potential $V_A + \Delta V_{A1}$, the video AGC circuit 20 performs peak AGC operation as described above and practically, gain is controlled so that the peak of the video signal component V may be equal to $V_A + \Delta V_{A1}$. As a result, the peak of the reference pulse P becomes a little lower than $V_A + \Delta V_{A1}$.

If the reference potential $V_A$ is lowered from the state shown in FIG. 6(a) by $\Delta V_{A2}$, the video signal component V becomes as shown in FIG. 6(b) in the conventional AGC circuit 20. In this case, since the peak of the video signal component V is considerably lower than $V_A$, only the keyed AGC operation is performed and with respect to any change of the peak of the video signal component V, AGC operation is not at all applied.

The reason for the phenomenon in the conventional AGC circuit 20 is that the level shifted amount of the synthesized signal (b) in FIG. 3, that is, the amplitude $V_P$ of the reference pulse P is determined by the product $I_1 \cdot R_1$ of the current $I_1$ flowing in the constant current transistor $Q_4$ and the resistance $R_1$ and this value is maintained constant in the conventional circuit 20 irrespective of the change of the variable resistor VR.

Therefore, improvement is made in this embodiment to solve that problem and as shown in FIG. 2 the reference pulse adjusting circuit 31 including a current mirror circuit is provided in this embodiment.

Referring to FIG. 2, the current $I_1$ is represented as $$I_1 = \frac{R_3}{R_2} \cdot I_2$$

where $I_2$ is current flowing in the mirror transistor $Q_{11}$. The current $I_2$ is obtained as $(V_A - 2V_{be})/(R_3 + R_4)$ with respect to the above stated reference potential $V_A$, that is, the base potential of the control transistor $Q_{12}$ and consequently on the amplitude $V_P$ of the reference pulse P is determined by $$V_P = \frac{V_A - 2V_{be}}{R_3 + R_4} \cdot \frac{R_1 R_3}{R_2}.$$

As a result, according to the change of $V_A$, the amplitude $V_P$ of the pulse P is also changed in the same direction.

By setting appropriately the respective resistance values of the resistors $R_1$ to $R_4$, the amplitude $V_{p0}$ of the reference pulse P (that is, the level shifted amount) is set as shown in FIG. 5(a) so that the amplitude of the composite video signal may be a desired value (for example $1V_{p-p}$) in relation to a certain value of the reference potential $V_A$ and that both the keyed AGC and the peak AGC may be performed. As a result, if the reference voltage $V_A$ is increased from this state by $\Delta V_{A1}$ by means of the variable resistor VR, the level shifted amount is increased from $V_{p0}$ by $\Delta V_{p1}$ and thus the signal waveform at the point B (the state before peak detection) is as shown in FIG. 5(c). More specifically, the synchronizing signal component S (reference pulse P) is increased by $\Delta V_{A1}$ to be equal to $V_{S1}$ and the amplitude of the video signal component V is also increased by a change amount $V_{S1}/V_{S0}$ of the synchronizing signal component S and accordingly the amplitude (the output gain) of the composite video signal is increased and the peak of the video signal component V becomes a little lower than the changed reference potential $V_A + \Delta V_{A1}$. Thus, in the state shown in FIG. 5(c), keyed AGC operation and peak AGC operation can be performed dependent on the changes of the synchronizing signal component S (the reference pulse P) and the peak of the video signal component, respectively.

If the reference potential $V_A$ is lowered from the state shown in FIG. 6(a) (the same as in FIG. 5(a)) by $\Delta V_{A2}$, the amplitude of the composite video signal is reduced contrary to the case in FIG. 5 and the level shifted amount is decreased from $V_{p0}$ by $\Delta V_{p2}$ to be as shown in FIG. 6(c). As a result, in this case also, keyed AGC operation and peak AGC operation can be performed dependent on the changes of the synchronizing signal component S (the reference pulse P) and the peak of the video signal component V, respectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic gain control circuit comprising:
   control video signal generating means for mixing a reference pulse in a pedestal of a clamped composite video signal to generate a control video signal,
   reference potential providing means for providing a reference potential serving as a reference for gain control of said clamped composite video signal,
   reference pulse control means coupled to said control video signal generating means and said reference potential providing means to change the amplitude of said reference pulse in accordance with said reference potential, and gain control means coupled to said control video signal generating means and said reference potential providing means for controlling the gain of said control video signal so that when a peak of said reference pulse is higher than a peak of said clamped composite video signal, the peak of said reference pulse may be equal to said reference potential and when the peak of said reference pulse is lower than the peak of said clamped composite video signal, the peak of said clamped composite video signal may be equal to said reference potential.

2. An automatic gain control circuit in accordance with claim 1, wherein
   said control video signal generating means comprises,
   a composite video signal input terminal,
   synchronizing signal separating means for separating a synchronizing signal from said clamped composite video signal applied from said input terminal,
   means for generating a reference pulse based on the synchronizing signal separated by said separating means,
   clamp means for clamping to a fixed potential a sync-tip level of the synchronizing signal of said clamped composite video signal applied from said input terminal, and
   mixing means for mixing said reference pulse generated by said reference pulse generating means in said clamped composite video signal having the synchronizing signal component clamped by said clamp means.

3. An automatic gain control circuit in accordance with claim 2, wherein
   said mixing means comprises a differential couple having two input terminals and a control terminal, said clamped composite video signal having said synchronizing signal component clamped being applied to either one of said two input terminals, said reference pulse being applied to the other one of said two input terminals and the output of said reference pulse control means being applied to said control terminal.

4. An automatic gain control circuit in accordance with claim 3, wherein
   said reference pulse control means comprises
   a current mirror circuit for controlling the current flowing in a control portion of said differential couple, and
   control means for controlling the current of said current mirror circuit based on said reference potential.

* * * * *

UNITED STATES PATENT AND TRADEMARK OFFICE
CERTIFICATE OF CORRECTION

PATENT NO. : 4,658,297

DATED : April 14, 1987

INVENTOR(S) : HIROSHI NOMURA ET AL

It is certified that error appears in the above-identified patent and that said Letters Patent is hereby corrected as shown below:

On the cover page, Item [30], change "Jun. 20, 1985" to --- Jun. 20, 1984 ---.

Signed and Sealed this

Eleventh Day of August, 1987

Attest:

DONALD J. QUIGG

Attesting Officer

Commissioner of Patents and Trademarks